Figure 1:
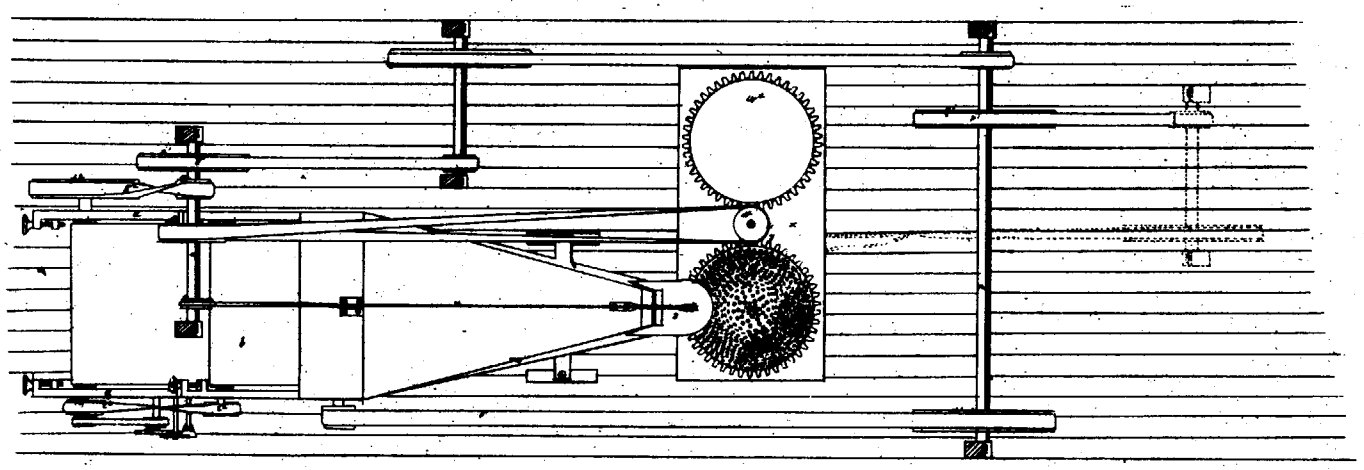

H. A. Wells.

Making Hat Bodies.

No 2942 Reissued May 14, 1868.

United States Patent Office.

ELIZA WELLS, OF BROOKLYN, NEW YORK, ADMINISTRATRIX OF THE ESTATE OF HENRY A. WELLS, DECEASED.

*Letters Patent No.* 4,472, *dated April* 25, 1846; *reissue No.* 396, *dated September* 30, 1856; *extended seven years*; *reissue No.* 1,087, *dated December* 4, 1860; *again extended seven years by act of Congress*; *reissue No.* 2,942, *dated May* 19, 1868.

IMPROVEMENT IN MACHINERY FOR MAKING HAT-BODIES.

The Schedule referred to in these Letters Patent and making part of the same.

*To all whom it may concern*:

Be it known that HENRY A. WELLS, late of the city, county, and State of New York, now deceased, did in his lifetime invent certain new and useful Improvements in Machinery for Making Hat-Bodies of Fur, for which said improvements Letters Patent of the United States were granted to said WELLS, bearing date the 25th day of April, 1846; and that the following is a full, clear, and exact description of the principle or character which distinguishes the said invention from all other things before known, and of the manner of making, constructing, and using the same, reference being had to the accompanying drawings making part of this specification, in which—

Figure 1 is a plan of the machine,

Figure 2, a longitudinal vertical section, and

Figure 3, a longitudinal elevation.

The other figures will be described in their appropriate places.

The same letters indicate like parts in all the figures.

Prior to the invention of the said HENRY A. WELLS, it had long been essayed to make hat-bodies by throwing the fibers of fur, wool, &c., from a carding-engine into the open air over a perforated cone, exhausted by a fan below, to draw down and hold the fibers thereon by the currents of air that rush from all directions toward and through the apertures of the cone; but, from the nature of the instrumentalities, and for the want of the improvements invented by the said WELLS, such machines could not be successful in the practical business of making hat-bodies.

A patent was granted to William Fosket, bearing date the 23d day of January, 1846, for a machine in which the fibers to be formed into a hat-body were separated by a bow-string, similar to that used in the hand process of bowing, but operated by machinery, and thence drawn by suction through a tube into the lower part of a chamber surrounding a pervious cone or former, the inside of which was to be connected with an exhausting-fan to exhaust the air from the inside thereof, to induce currents in the surrounding air to rush in all directions toward the outer surface of the pervious former, and through the apertures thereof, and thus to carry the fibers from the lower part of the surrounding chamber toward, and deposit and hold them on the outer surface of the said former.

This machine, however, by reason of the devices, was too slow and uncertain in its operation to supersede the hand process of bowing.

Hat-bodies are required to be made thicker at or near the brim than at the tip, being thickest at the band or intersection of the side crown and brim of the completed hat, and tapering from the band toward the edge of the rim, and toward the tip, being sometimes a little heavier at the square or junction of the crown and tip. Therefore the greater quantity of fur must be incorporated in that part which is to form the band of the completed hat-body, and, owing to the variation of relative sizes of brims and crowns of hats, the position of the extreme thickness of hats also varies between them within limits well known to practical hatters.

This required disposition of the fur fibers is obtained by the manipulation of a competent hatter skilled in the hand process of "bowing;" and one of the leading features of the invention of the said WELLS consists in combining with a rotating brush or picker, and a rotating pervious exhausted cone, a means whereby the requisite greater quantity of fur thrown by the picker toward the cone is caused to lodge upon the cone at the required distance from its base to make the band of the hat-body of the required thickness, said means being a plate or directing-surface interposed between the rotating brush or picker and the base of the cone, which plate extends from the brush or picker toward the cone beneath the current of fur, in such direction as to point at a part of the cone above the lowermost perforated portion of it.

In machines in which the fibers are not properly directed, but are drawn to the surface by the action of the exhaust, the force thus induced gradually decreases as the apertures on the cone are closed up by the accumulation of the fur deposited on the outer surface thereof, and, in consequence, the required distribution cannot be obtained with certainty.

In the manufacture of fur hat-bodies by machinery, it is important to be able to make any given number of them of any desired equal weight, and, as fur is a costly material, it is desirable that each hat-body should be made of the precise quantity of fur allotted to it, and that this should be effected without waste, a result which cannot be obtained by a machine in which the fur is disintegrated and thrown by a carding-engine, for the following reasons: If the required weight of fur for one hat-body is placed on the feed-apron of the carding-engine, a considerable portion of it will lodge between the card-teeth of the several cylinders, and much of it will drop on the floor of the room, so that only a portion will reach the pervious cone; and if more than the required weight is placed on the feed-apron, there is no means by which to determine when the required quantity is deposited on the pervious cone. Of the fur which lodges between the card-teeth, and which drops on the floor, and is not thrown about promiscuously in the room, only a portion can be recovered, and at a cost of labor nearly if not quite equal to its value.

The combinations of machinery invented by the said HENRY A. WELLS have such a mode of operation that any given weight of fur which is placed on the feed-apron will be delivered onto the pervious cone, so that any number of separate batches of fur, separately weighed, and separately placed on the feed-apron of the machine, will be formed into bats suitable for hat-bodies, corresponding in weight and number with the several batches of fur, and the fur fibers will be directed and controlled from the rotating, picking, and disintegrating brush and picker to the exhausted pervious cone or former, so as to be deposited and distributed thereon, of equal thickness in the direction of the circumference, and of unequal thickness in the direction of the length, as required, that the hat-body may be made of the required strength with the least weight of fur, that is, thick for strength at and about the band, and thin along the crown and tip. And as the bat of fur fibers so formed of the required weight, and with the fur properly distributed, is only held to the surface of the pervious cone by the pressure of the surrounding air, induced by exhausting air from the inside, and it would fall to pieces if the pressure of the surrounding air were suspended, and it is necessary to remove one bat, when completed, from the machine, that another may be formed, by the combinations so invented by the said WELLS, means are provided for holding the bat, that the cone may be taken from the machine preparatory to the final hardening of the bat, to admit of removing it from the pervious cone in a suitable condition for the after well-known processes of felting, planking, &c.

In the accompanying drawings—

*a* represents a frame suitable for the purpose, and *b*, a feed apron, on which the stock of fur is spread by an attendant in separate parcels, each sufficient for the formation of a hat-body of the required weight.

At the back end of the machine, this feed-apron or endless belt of cloth, or other suitable material, passes around a roller, *c*, which has its bearings in sliding boxes, provided with adjusting-screws *e e*, for the convenience of keeping the apron tight, and this apron also passes around a lip, *d*, near the rotating brush or picker, or, as an equivalent, around a small roller, *g*, which should be properly supported between the end journals, as represented in section, fig. 4.

Above there is a corresponding lip, $d^1$, and apron $b^1$, which apron is inclined to gradually compress the fur, the better to insure the entrance of it between the lips as it is moved forward by the feed-apron *b*.

The upper apron passes around the lip $d^1$, and a roller, $c^1$, mounted in sliding boxes, provided with set-screws $e^1$ $e^1$, in manner similar to the under feed-apron.

The roller $c^1$ is mounted in the frame *i*, of which the lip $d^1$ forms part, and the frame is hung on journals mounted in standards *j*, so that the lip $d^1$ can be made to gripe the fur fibers between it and the under lip *d*, the better to present them to the action of the rotating picker *f*.

The tension of the belt $i^2$, which communicates motion to the roller $c^1$, gives the griping pressure; but this may be effected by means of springs, weights, or other well-known devices for making pressure under similar circumstances.

The fibers of fur, as they pass from the feed-apron, are acted upon by a brush or picker, *f*, that rotates with great velocity, and which is composed of parallel rows of stiff bristles, projecting from a cylinder, but which may be differently constructed and composed, if desired.

At some distance from the rotating brush or picker is placed the cone or former *o*, made in any of the usual forms required for hat-bodies, but of thin sheet metal, perforated with numerous fine holes, that being better than wire-gauze.

The lower edge rests on a ring, *w*, fitted to turn in an appropriate collar in the upper part of a case, *x*, and its outer periphery is provided with cogs that mesh into the cogs of a pinion, *y*, (concealed in the drawings by the pulley $d^2$,) on a vertical shaft, *z*, by which a slow rotary motion is given to the cone, as the fibers are deposited on its surface, that the distribution may be equal all around.

The case *x* may be formed to receive only one such cone at a time, or made of sufficient length to receive two rings, *w*, one on each side of the pinion *y*, by which both will be rotated; and the case, when made for two, must be constructed so as to swivel on a collar, $f^1$, to which its bottom is to be fitted, that when a bat of fur fibers has been formed on one cone, it can be moved out of line by turning the case or cone-stand half a revolution, and another cone put onto the other ring, that another bat may be formed, while the one already formed may be properly treated to admit of removing it from the exhaust, as will be presently described.

The case *x* communicates, through the hollow collar $f^1$, with the case of an exhausting fan-blower, $g^1$, which consists of a vertical harbor, $h^1$, with oblique vanes $i^1$, so that when rotated with great velocity in direction of the arrow, the air will be exhausted from the case *x* and the inside of the perforated cone *o*.

When the case is made to receive two cones, and one is removed from one of the rings *w*, the aperture in the ring *w* must be closed up with a cap-plate, $w^2$, to prevent the free entrance of air. Any other mode of exhausting the case and cone may be employed, but this is deemed the best.

When the cone is exhausted, currents of air are induced from all directions toward and through the apertures to the inside of the cone, and, as the fibers accumulate on the surface, and gradually close up the apertures, the force of these currents is gradually reduced, and in proportion to the thickness of the bat.

As the fibers are taken from the feeding mechanism by the rotating brush or picker, and by it picked and thrown, they are guided and directed to be properly distributed from the base to the tip of the pervious cone to form a bat of the required varying thickness, suitable for a hat-body, and to prevent waste, and this is effected by the following means:

From the under part of the rotating brush or picker there is a plate, $f^4$, which extends toward the pervious cone, an open space, *n*, being left between that end of the plate which is nearest the picker and the concave *l*, below the feeding-mechanism, that a current of air may enter freely to assist in carrying the fibers toward the cone as they are thrown by the brush or picker. This plate $f^4$ guides the fibers as they are traveling, and prevents too great an accumulation of them immediately around the lower edge of the cone, the greatest thickness of bat being required to be deposited some distance above, that the bat, when made, may be thickest at and about the junction of the rim and crown, technically termed the "band." And it also prevents waste, as otherwise many of the fibers would be carried by the force of the gravity below the influence of the currents traveling toward the cone, particularly toward the end of the operation, when the currents induced by the exhausting-fan become very faint. This plate rests on an adjusting-screw, *p*, so that that end of it which is nearest the cone can be readily elevated or depressed relatively to the base of the cone, as it may be desired to vary the distribution of the fibers with the view to make hats with a broad or narrow rim, and with the rim thicker or thinner relatively to the other parts. And with a view to facilitate this distribution, the plate is made in two parts, with the part beyond the supporting-screw $p$ and nearest the cone, hinged to the other part, and provided with a cam and lever, $q$, or other equivalent device.

There is an upper guide or deflector, $r$, which extends from the feeding mechanism over the rotating brush or picker, and forward of it toward the cone, to direct the fibers, and effect a proper distribution of them on the tip of the cone, and down the sides thereon toward the base. The better to effect the distribution of the fibers on the cone, the under surface of this guide or deflector nearest the picker-brush is flat, or parallel with the axis of the picker-brush, and thence, toward the other end, concave, and of a gradually-increasing concavity toward the cone. And still further to diversify the distribution of the fibers, in additional deflector, $s$, somewhat in the form of a hood, is hinged to the end of the deflector $r$ nearest the cone, so that it can be moved by a cord, $u$, passing over a pulley, $v$, or by a lever, $u'$, actuated by an eccentric, $t$, or a cam on a shaft, $a^2$.

On each side there is a guide, $m$, extending from the picker-brush toward the cone. These guides prevent fur fibers from escaping laterally out of the proper influence of the currents which are traveling toward the cone, and which otherwise would go to waste, and they also prevent the fibers which are traveling toward the cone from being disturbed by lateral or foreign currents, which are not induced by the rotating brush or picker, or by the exhausting of the cone.

By placing the two guides relatively the one to the other, as represented, that is, further apart at the picker or brush than toward the cone, a much longer picker or brush can be used than if they were parallel. When so placed they gradually contract the fur-bearing current as it approaches the cone, so that a greater quantity of fur can be disintegrated and thrown in a given time than with a picker or brush so short as would be required if the side guides were parallel.

In the machine illustrated by the accompanying drawings the bottom plate, top guides, or deflector, and side guides, are all united along their edges.

All the operative parts may be set in motion by any of the known means, such as belts, as fully represented in the accompanying drawings, in which $m'$ is a main line-shaft overhead, driven by any first mover. From a wheel, $n'$, on it a band, $o'$, extends to a pulley, $p^1$, on the shaft of the brush, which should make about two thousand revolutions per minute, more or less. From another wheel, $q'$, on this same shaft, a band, $r^1$, extends to a pulley, $s'$, on the shaft of which there is a wheel, $t''$, that drives the exhaust-fan $g^1$ by the belt $u''$, and from a pulley, $v'$, on the same line-shaft, a belt extends to a wheel, $w^1$, on the shaft of which there is a pulley, $a'$, from which extends another belt, $y'$, to a wheel, $z'$, on the shaft $a^2$, that carries the eccentric $t$, to give all the reduced motions required for the other parts of the machinery. From a wheel, $b^2$, on this shaft a belt, $c^2$, extends to a pulley, $d^2$, on the shaft $z$, that rotates the cone $o$, and another pulley, $e^2$, drives the wheel $f^2$ of the feed-roller $c$ by a belt, $g^2$, and on the other end of the axle of this feed-roller there is a pulley, $h^2$, which drives, by a cross-belt, $i^2$, the upper feed-roller $c^1$.

If desired, an alarm can be connected with the feed-roller of the lower apron, to announce to the attendant when each charge of stock is exhausted, that the cones may be shifted. This can be done by connecting the arbor of the feed-roller $c$ of the lower feed-apron by a belt with a wheel, $k^2$, provided with a cam or pin, to lift, at every revolution, the hammer $l^2$ of a bell, $m^2$, the striking of which shall give requisite indication.

After one batch of the fur which was spread on the feed-apron by the attendant has been deposited on the pervious cone, the non-united fibers are there held in the form of a bat of fibers only by the pressure of the surrounding air, induced by exhausting the air from the inside of the cone, and hence if, in that condition, the operation of the exhausting mechanism should be suspended, the fibers would be no longer held by the pressure of the surrounding air, and would, by force of gravity, fall and destroy the bat. To prevent this, and render the bat thus formed by the mechanism above described available in the manufacture of hats, there is combined, with the mechanism by which the required form is given to the bat of fibers, means for holding the fibers on the cone without the pressure of the surrounding air, that the cone may be removed from the machine, and taken where the bat can be suitably hardened by partial felting, to admit of removing it safely from the cone. This important result is effected by the use of a flexible cloth.

The attendant takes from a kettle of hot water a piece of felt or other cloth, rolled upon a roller, and applies one end of it to the surface of the bat, still held by the pressure of the surrounding air, and, as the cone rotates, the felt cloth winds from the roller onto the bat, and as the tip of the cone is semispherical, and this cloth cannot be conveniently extended over the tip, another piece of cloth, also taken from hot water, is applied to the tip of the bat. It is well known that the application of hot water to a bat of fur fibers which have been suitably prepared to be made into hats by the well-known felting process, is to partially felt the bat, so that the fibers will hold together; and in the condition above specified, not only could the cone be removed from the machine, but the bat could be safely removed from the cone by careful handling. To harden the bat to a state of greater consistency, after the wet cloths have been applied, as above stated, a strong perforated metallic cone, $k'$, (see Figure 6,) is put over the cloth, and the whole is then dipped in hot water, and after that the bat can be removed from the cone, and handled without the necessity of much care.

As the perforated cone $o$ is better when made very thin, the pressure of the water, when drawing it out of the kettle, after the bat has been hardened, tends to and would collapse it, and, therefore, to prevent this, another perforated metallic cone, $t'''$, (see Figure 7,) is put inside before the whole is immersed in hot water, to sustain the pressure in drawing the whole out of the hardening-kettle. The relative situation of the three cones, the bat, and the covering of felt cloth, preparatory to the final hardening process, is represented on an enlarged scale at Figure 8, which is a vertical section through the whole. The inner sustaining-cone may be dispensed with, if desired, by making the cone $o$ of greater thickness and strength.

From the foregoing, it will be seen that, on a machine consisting of the combinations specified, hat-bodies of fur fibers can be made with great rapidity, of the forms required by the trade, for being made into hats of uniform thickness in the direction of the circumference, and of any of the required variations in thickness from brim to tip, such as demanded by the trade and by economy, and that any number of hat-bodies can be made of uniform weight, as all the fur of each separate batch deposited on the feed-apron will be deposited on the cone, without the necessity of any exercise of judgment or skill on the part of the attendant.

Having thus described the mode of application of the said invention of the said HENRY A. WELLS, as the same was successfully reduced to practice by him, I do not wish to be understood as limiting the claim of invention to such mode of application, as other modes may be devised having the same mode of operation, and only differing from it in form, or in the substitution of equivalent means.

What I claim as the invention of my late husband, the said HENRY A. WELLS, deceased, and desire to secure by Letters Patent, is—

1. The combination of the rotating brush or picker, substantially such as described, the rotating pervious cone, provided with an exhausting mechanism, substantially as described, and the bottom plate or guide, substantially as described, for directing the fur fibers toward the lower part of the cone, and preventing the fibers going to waste, the said combination having the mode of operation specified, and for the purpose set forth.

2. The combination of the feed-apron, the rotating brush or picker, substantially as described, the rotating pervious cone, provided with an exhausting mechanism, substantially as described, and the guide or deflector, for directing the fur fibers onto the tip and upper part of the cone, substantially as described, the said combination having the mode of operation specified, and for the purpose set forth.

3. The combination of the rotating brush or picker, substantially as described, the rotating pervious cone, provided with an exhausting mechanism, substantially as described, and the side-guides, or either of them, substantially as described, to prevent fur fibers from getting out of the proper influence of the currents traveling to the cone, and to protect the traveling fibers from disturbing currents, the said combination having the mode of operation specified, and for the purposes set forth.

4. The combination of the feeding-apron, on which the fur can be placed in separate batches, as described, the rotating brush or picker, substantially as described, the rotating pervious cone or former, provided with an exhausting mechanism, substantially as described, the said combination having a mode of operation substantially such as described.

5. The combination of the feed-apron, on which the fur fibers can be placed in separate batches, each in quantity sufficient to make one hat-body, the rotating brush or picker, substantially as described, the rotating pervious cone, provided with an exhausting mechanism, and the devices for guiding the fur fibers, substantially as described, the combination having the mode of operation specified, and for the purpose set forth.

6. In combination with the pervious cone, provided with an exhausting mechanism, substantially as described, the covering-cloth, wet with hot water, substantially as and for the purpose specified.

ELIZA WELLS.

Witnesses:

JOHN CURTIS,

GEORGE JOHNSTON.